(12) United States Patent
Rizzo

(10) Patent No.: US 10,617,053 B2
(45) Date of Patent: Apr. 14, 2020

(54) CORE RECOVERY VEHICLE

(71) Applicant: Salvatore J Rizzo, Southington, CT (US)

(72) Inventor: Salvatore J Rizzo, Southington, CT (US)

( * ) Notice: Subject to any disclaimer, the term of this patent is extended or adjusted under 35 U.S.C. 154(b) by 0 days.

(21) Appl. No.: 16/107,379

(22) Filed: Aug. 21, 2018

(65) Prior Publication Data
US 2020/0060057 A1 Feb. 27, 2020

(51) Int. Cl.
*A01B 45/00* (2006.01)
*A01B 45/02* (2006.01)

(52) U.S. Cl.
CPC ............ *A01B 45/023* (2013.01); *A01B 45/00* (2013.01)

(58) Field of Classification Search
CPC .............................................. A01B 45/00–023
See application file for complete search history.

(56) References Cited

U.S. PATENT DOCUMENTS

| | | | | |
|---|---|---|---|---|
| 2,709,011 A | * | 5/1955 | Radin | ..................... A01D 87/02 |
| | | | | 414/567 |
| 4,878,802 A | * | 11/1989 | Hansen | .................. A01D 51/00 |
| | | | | 414/523 |
| 5,002,453 A | * | 3/1991 | Shigehisa | .............. A01B 45/00 |
| | | | | 172/22 |
| 5,069,293 A | * | 12/1991 | St. Romain | ............ A01B 45/02 |
| | | | | 171/144 |
| 5,178,221 A | * | 1/1993 | Hamawaki | ........... A01B 45/023 |
| | | | | 172/22 |

(Continued)

OTHER PUBLICATIONS

Salsco Rollers, PDF from YouTube Video, Jul. 3, 2013.*

(Continued)

*Primary Examiner* — Matthew Troutman
(74) *Attorney, Agent, or Firm* — Robert S. Smith

(57) ABSTRACT

A core recovery vehicle for recovering cores from turf which includes an elongated chassis having elongated sides and a front and a back. $1^{st}$ and $2^{nd}$ V-shaped wipers are carried on the chassis in a substantially horizontal orientation proximate to the front of the core recovery vehicle whereby the $1^{st}$ and $2^{nd}$ V-shaped wipers funnel cores from an open front to an apex opening of each V-shaped wiper; and $1^{st}$ and $2^{nd}$ elevators substantially aligned respectively with the apex opening of the $1^{st}$ and $2^{nd}$ V-shaped wipers, the $1^{st}$ and $2^{nd}$ elevators are substantially aligned with and have substantially all major parts thereof coincident respectively with $1^{st}$ and $2^{nd}$ substantially vertical virtual parallel spaced apart planes substantially aligned with the major axis of the chassis.

6 Claims, 4 Drawing Sheets

(56) References Cited

U.S. PATENT DOCUMENTS

| | | | | |
|---|---|---|---|---|
| 5,337,833 | A * | 8/1994 | Rizzo | A01G 20/30 |
| | | | | 172/520 |
| 6,655,467 | B2 * | 12/2003 | Pfisterer | A01B 45/00 |
| | | | | 172/22 |
| 7,934,886 | B2 * | 5/2011 | Dufty | A01G 20/30 |
| | | | | 404/123 |
| 8,662,193 | B2 * | 3/2014 | Hill | A01B 45/02 |
| | | | | 171/63 |
| 8,967,285 | B2 * | 3/2015 | Hill | A01B 45/02 |
| | | | | 172/21 |
| 10,143,123 | B2 * | 12/2018 | Shaw | A01B 45/023 |
| 2012/0186214 | A1 * | 7/2012 | Michel | A01B 45/00 |
| | | | | 56/14.9 |

OTHER PUBLICATIONS

Salsco, Inc Salsco Rolleres at the 2013 US Open Merion Golf Club US Open 2013 v4 https://www.youtube.com/watch?v=9J5NdetvC-k&t=96s.

* cited by examiner

CORE RECOVERY VEHICLE

BACKGROUND OF THE INVENTION

The present invention is generally directed to turf management. Turf management is of concern for golf course greens and fairways, sports arenas as well as other lawns.

Typically, turf management includes aeration. The soil becomes more compacted over time, particularly soils with high clay content. Compact soils have increased density, resulting in lower soil-oxygen level as well as decreased water and nutrient movement. In general, core aeration improves turf-growing conditions near the surface by loosening the soil and reducing thatch as well as facilitating delivery of oxygen, water, and nutrient. Thus, core aeration is a preferred choice for residential and commercial turf care. Core aeration removes a small core or "plug" of soil from the ground leaving a hole in the turf. In general, aeration improves turf-going conditions near the surface by loosening soil and reducing thatch.

A core-aeration machine punches cores out of the turf. After extraction of cores, the cores are typically discharged to the turf surface by the aeration apparatus. Conventionally, the cores are shoveled or pushed away. The apparatus in accordance with the present invention Typically, the holes remaining after the extraction and removal of the cores are filled with sand to facilitate passage of oxygen, water, and nutrients. It is of great importance that the holes are not malformed by the passage any vehicle passing over the turf after extraction of the cores. For example, the core removal process should not compromise the integrity of the holes.

Some core recovery vehicles have been utilized, however, such machines are often large and heavy and may deform the holes in the turf. Any such deformation is not desirable because it tends to decrease the aeration goals of increased passage of water and nutrient, in addition to causing ruts that compromise the planar qualities of the course surface.

The apparatus in accordance with the present invention picks up the cores with no manual labor. Conventionally, five men hand shoveling each green and moving the cores take 45 to 60 minutes to accomplish the same task on one green. One man operating the apparatus in accordance with the present invention and one man driving a waste collection vehicle can do the average green in about 10 minutes Typically, golf course fairways and greens, as well as athletic fields and other lawn areas deemed to justify careful attention, are aerated to provide a healthier, more lush turf. The aeration is desirable because of thatch buildup and soil compaction. Soil tends to compact over time, especially in the case of soils with higher clay content. Compacted soils have increased density, resulting in lower soil-oxygen levels and increased density. This results in lower soil-oxygen levels as well as decreased water and nutrient movement. Core aeration removes a small core or plug of soil from the ground. The cores are generally cylindrical and comprise layers of grass, thatch, and soil which may include roots, soil, stones, sand, and clay.

A major concern with known apparatus to collect cores is that the vehicle is often large and heavy and supported on the turf in a manner that concentrates the weight of the vehicle on a very small surface area. The concentration results in deformation of the holes formed when the cores are removed as well as forming ruts. Any deformation of the holes compromises the goals of the soil aeration. Any rut formation compromises the appearance and functionality of the surface. Thus, such load concentration is to be avoided.

From the above, it is therefore seen that there exists a need in the art to overcome the deficiencies and limitations described herein and above.

SUMMARY OF THE INVENTION

Accordingly, it is an object of the present invention to avoid concentrating the weight of the vehicle in a manner that would compromise the holes in the turf formed by the extraction of cores.

It is another object of the present invention to provide apparatus that distributes the mass of the vehicle in a manner that is more uniform than in other known apparatus.

The objects of the present invention are achieved in a core recovery vehicle for recovering cores from turf which includes an elongated chassis having elongated sides and a front and a back. $1^{st}$ and $2^{nd}$ V-shaped wipers are carried on the chassis in a substantially horizontal orientation proximate to the front of the core recovery vehicle whereby the $1^{st}$ and $2^{nd}$ V-shaped wipers funnel cores from an open front to an apex opening of each V-shaped wiper; and $1^{st}$ and $2^{nd}$ elevators substantially aligned respectively with the apex opening of the $1^{st}$ and $2^{nd}$ V-shaped wipers, the $1^{st}$ and $2^{nd}$ elevators are substantially aligned with and have substantially all major parts thereof coincident respectively with $1^{st}$ and $2^{nd}$ substantially vertical virtual parallel spaced apart planes substantially aligned with the major axis of the chassis.

The chassis may be supported by at least $1^{st}$, $2^{nd}$, and $3^{rd}$ rolls, the $1^{st}$ roll may be disposed with an axis that is substantially perpendicular to the $1^{st}$ and $2^{nd}$ planes, the $2^{nd}$ and $3^{rd}$ rolls being supported by respective yokes carried by the chassis whereby the geometric axis of each of the $1^{st}$ and $2^{nd}$ rolls can rotate about a respective vertical axis disposed in a respective plane that is perpendicular to the $1^{st}$ and $2^{nd}$ planes. The 1st roll may be disposed closer to the front of the apparatus than the 2nd and 3rd rolls. In some embodiments, the 2nd and 3rd rolls are respectively mounted by respective $1^{st}$ and $2^{nd}$ yokes engaging respectively axially spaced parts of respectively a $1^{st}$ geometric axis of the $2^{nd}$ roll and 2nd geometric axis of the $3^{rd}$ roll. The $1^{st}$ and $2^{nd}$ yokes may be rotatable to steer the vehicle.

5. A core recovery apparatus as described in claim 3 wherein said $1^{st}$ and $2^{nd}$ and $3^{rd}$ yokes are rotatable to steer the vehicle.

Some embodiments include apparatus for coupling all three of the rolls for steering whereby steering is achieved with the respective axis of each roll is disposed at a different angle than the the axis of each other roll when the apparatus is steered.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION OF THE INVENTION

Figure 1:
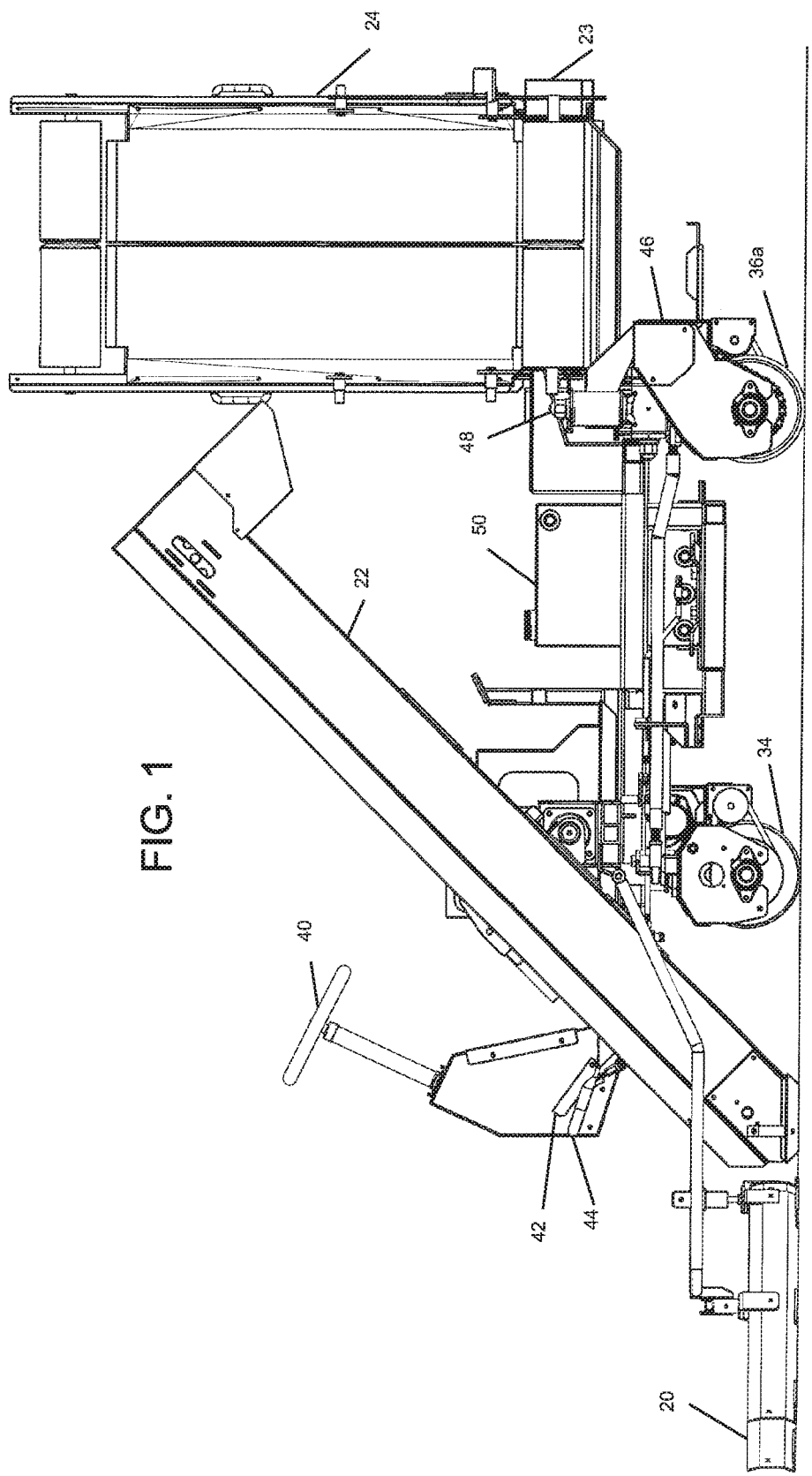
FIG. 1 is a left-side view of one embodiment of the core recovery vehicle in accordance with one form of the present invention, FIG. 2 it is a left-side view of one embodiment of the core recovery vehicle shown in FIG. 1, FIG. 3 it is a front view of the core recovery vehicle shown in FIG. 1, and FIG. 4 it is a rear view of the core recovery vehicle shown in FIG. 1.

The core recovery vehicle apparatus 10 in accordance with one form of the present invention is a freestanding powered vehicle for harvesting or collecting cores. Symmetrically disposed on each side of the vehicle are pairs of wipers or floating guide blades 20 that direct cores disposed on the ground in front of the vehicle 10. Each pair of blades 20 feeds one of the two elevators 22 disposed symmetrically on opposed sides of the vehicle. Both elevators 22, feed a fixed waste conveyor 23 that cooperates with an end abutting pivot waste conveyor 24. The fixed waste collector 23 is horizontal and is dimensioned and configured to receive plugs. In some cases, the quantity of plugs is periodically discharged to an associated collection vehicle. In other cases, the associated collection vehicle is positioned by another operator to track the movement of the core recovery vehicle whereby the pivot waste conveyor 24 continuously discharges the cores to the waste recovery vehicle as the core recovery vehicle traverses a turf section.

The angle of inclination of the pivot waste conveyor 24 is adjustable to permit cooperation with an associated collection vehicle (not shown). As shown in the drawing the fixed waste conveyor 23 is horizontal. The pivot waste conveyor 24, shown in a vertical position, cooperates with the fixed waste conveyor 23. It will be understood that the angular position the pivot waste conveyor 24 with respect to the fixed waste conveyor 23 is adjustable to accommodate cooperation with another vehicle (not shown). The associated vehicle typically has an open top to facilitate capture of the cores discharged by the pivot waste conveyor 24.

Figure 2:
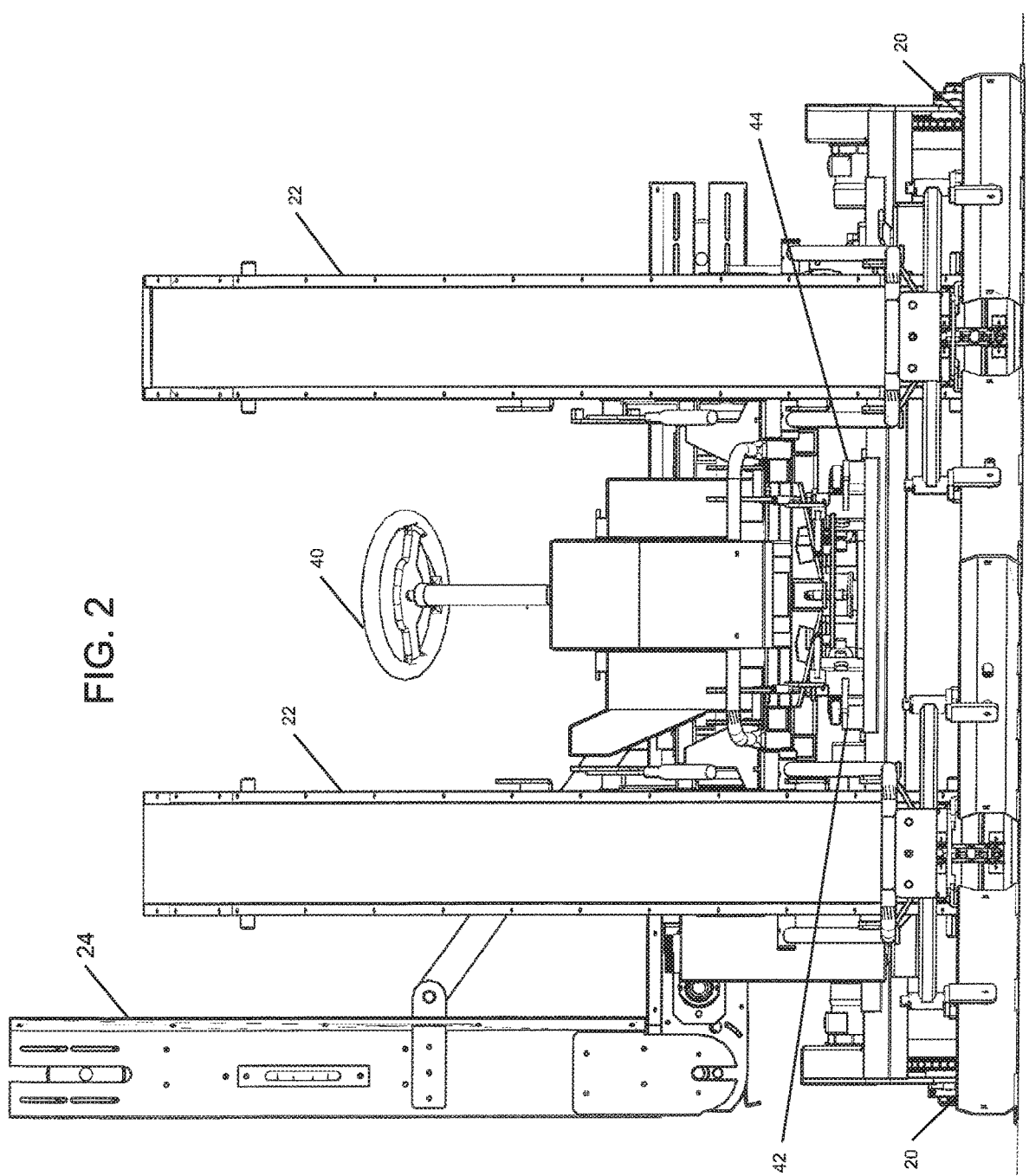
Figure 3:
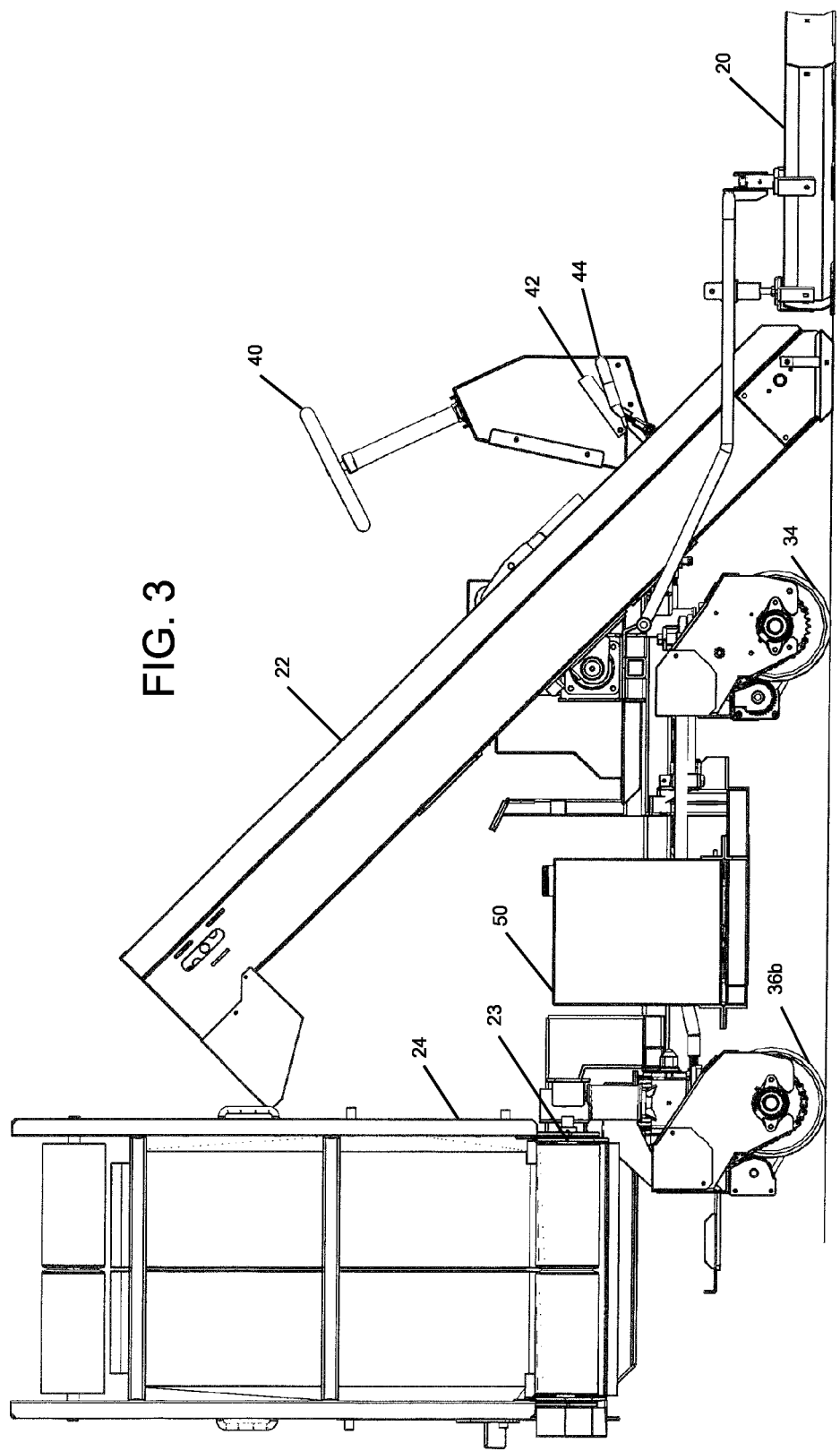
Figure 4:
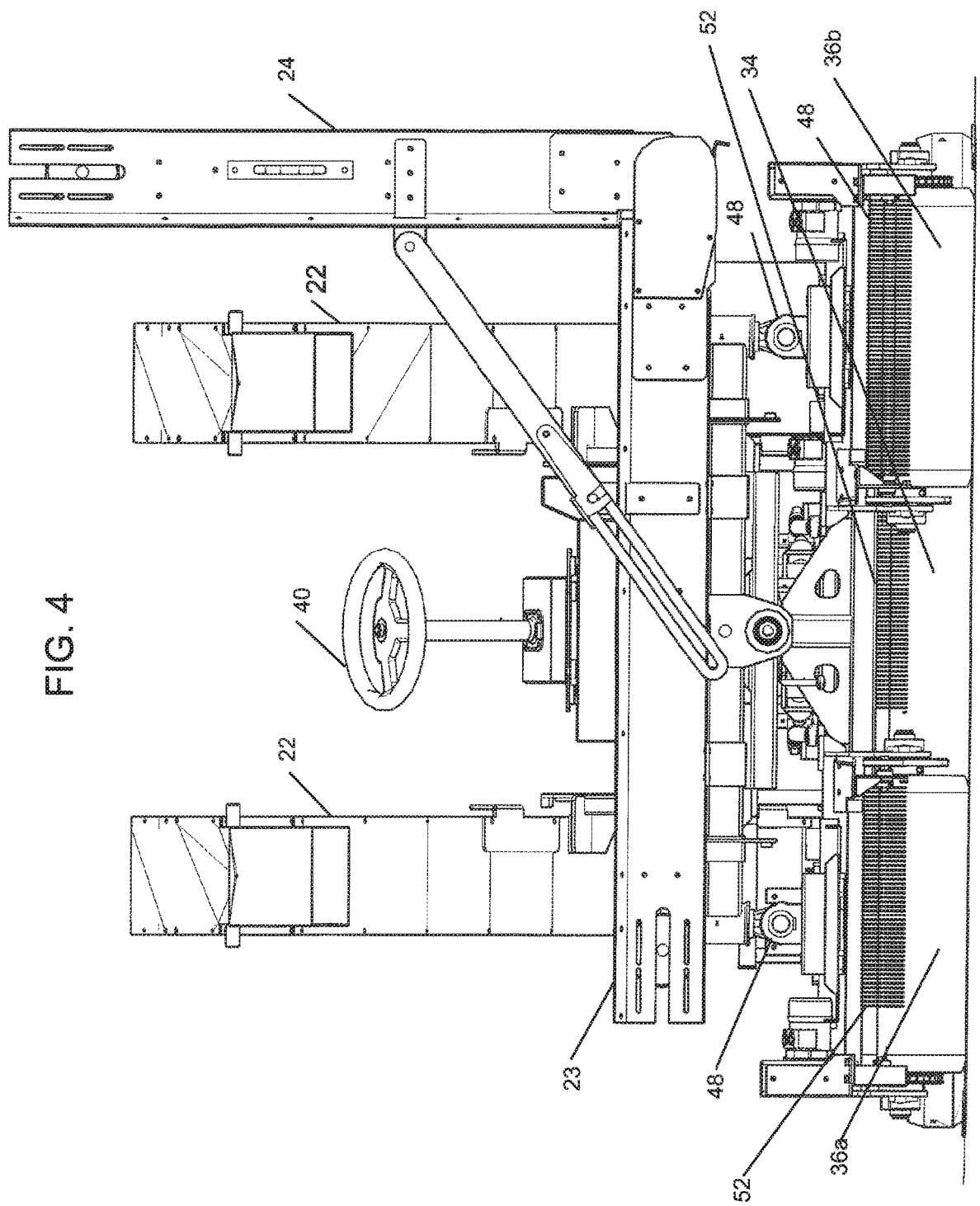

The present invention minimizes the risk of deforming the holes in the turf after removal of the cores from the turf. More particularly, the risk of deforming the risk of deforming the holes in the turf after removal of the cores from the turf is achieved, in part, in one form of the present invention by the utilization of a front cylindrical roll 34 which, in one form of the present invention has a diameter of 10¾ "and a length of 36" and left and right rear rolls 36a. 36b (that are coaxial as viewed in FIG. 2) Each has a diameter of 10¾ "and a length of 24" to support the vehicle 10. The front roll 34, as best seen in FIG. 4, is centered with respect to the vehicle 10. The left and right rear rolls 36a and 36b are laterally spaced apart as best seen in FIG. 3. The apparatus accordingly distributes weight thereof over a much larger area than prior art apparatus.

Furthermore, the use of two symmetrically disposed (with respect to the longitudinal axis of the vehicle) elevators 22, 22 maximizes the speed at which the apparatus can complete core retrieval in addition to improved weight distribution to avoid weight concentration at a limited part of the vehicle. Those skilled in the art will recognize that the elevators 22 constitute a substantial part of the weight of the apparatus.

The positioning of the two elevators namely on each side of the apparatus in a substantially symmetrical relationship results in better weight distribution. Accordingly, the risk of deforming the holes purposely made in the turf and consequent compromise of the entire purpose of the aeration is minimized.

The vehicle also includes a steering wheel 40, a forward pedal 42, a reverse pedal 44 and a hydraulic fluid tank 50. The left and right rear rolls 36a and 36b are supported by respective roll housings 46 carried by respective roll housing mounts 48. The mounts 48 are essentially offset yokes allowing rotational movement about a vertical axis. The illustrated embodiment of the invention provides synchronous rotation of the left and right rolls 36a and 36b respectively about a virtual vertical axis extending respectively through discrete roll housing mounts 48 that are best seen in FIG. 4.

The front roll 34 is connected by two tie rods to the left and right rear rolls 36a, 36b whereby when the axis of the front roll 34 turn clockwise, the left and right rear rolls 36a, 26b turn counterclockwise. Conversely, when the axis of the front roll 34 turn counterclockwise, the left and right rear rolls 36a, 26b turn clockwise. This construction allows each roll to turn at a different angle from each other roll to allow smooth turning without any scuffing or marking of the grass.

Respective rotary brushes 52 best seen in FIG. 4, are provided to clean the rolls 36a and 36b to avoid seeds being carried from one area to another area.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A core recovery vehicle for recovering cores from turf which comprises:
    an elongated powered chassis having elongated sides and a front and a back;

$1^{st}$ and $2^{nd}$ elevators carried on said vehicle on opposed sides thereof;

$1^{st}$ and $2^{nd}$ pairs of V-shaped wipers carried on said chassis in a substantially horizontal orientation proximate to the front of the core recovery vehicle whereby each pair of V-shaped wipers funnel cores from an open front to an apex opening of each V-shaped wiper; and said $1^{st}$ and $2^{nd}$ elevators are substantially aligned respectively with the apex opening of said $1^{st}$ and $2^{nd}$ pairs of V-shaped wipers, said $1^{st}$ and $2^{nd}$ elevators being substantially aligned with and have substantially all major parts thereof coincident respectively with $1^{st}$ and $2^{nd}$ substantially vertical virtual parallel spaced apart planes substantially aligned with the major axis of the chassis said vehicle including a fixed waste collector dimensioned and configured for receiving cores discharged by said $1^{st}$ and $2^{nd}$ elevators in addition to a pivot waste conveyor for selective discharge of cores deposited in said fixed waste collector by said elevators;

said chassis being supported by at least $1^{st}$, $2^{nd}$, and $3^{rd}$ rolls, said $1^{st}$ roll being disposed with an axis that is substantially perpendicular to said $1^{st}$ and $2^{nd}$ planes, said $2^{nd}$ and $3^{rd}$ rolls being supported by respective yokes carried by said chassis whereby the geometric axis of each of the $1^{st}$ and $2^{nd}$ rolls can rotate about a vertical axis in a plane that is perpendicular to said $1^{st}$ and $2^{nd}$ planes; and the paths of said $2^{nd}$ and $3^{rd}$ rollers incident to the forward motion of said vehicle overlap the path of said $1^{st}$ roller incident to the forward motion of said vehicle and the width of the collective paths for the $1^{st}$, $2^{nd}$ and $3^{rd}$ rollers being substantially equal to the width of said vehicle and means for driving.

2. A core recovery apparatus as described in claim 1 wherein said 1st roll is disposed closer to the front of said apparatus than said 2nd and 3rd rolls.

3. A core recovery apparatus as described in claim 1 wherein said 2nd and 3rd rolls are respectively mounted by respective $1^{st}$ and $2^{nd}$ yokes engaging respectively axially spaced parts of respectively a $1^{st}$ geometric axis of said $2^{nd}$ roll and 2nd geometric axis of said $3^{rd}$ roll.

4. A core recovery apparatus as described in claim 2 wherein said $1^{st}$ and $2^{nd}$ and $3^{rd}$ yokes are rotatable to steer the vehicle.

5. A core recovery apparatus as described in claim 1 further including: means for coupling said rolls to rotate the respective axis of each roll at a different angle when the apparatus is steered.

6. A core recovery apparatus as described in claim 1 further including: means for coupling each of said rolls to rotate the respective axis of each roll at a different angle when the apparatus is steered.

* * * * *